Patented Aug. 6, 1940

2,210,639

UNITED STATES PATENT OFFICE 2,210,639

TREATMENT OF MONOMERIC STYRENE

Sylvia M. Stoesser, Midland, Mich., assignor to The Dow Chemical Company, Midland, Mich., a corporation of Michigan No Drawing. Application October 1, 1938, Serial No. 232,802

3 Claims. (Cl. 260—669)

This invention relates to a method of treating aromatic vinyl compounds, particularly styrene, to prevent the formation of discolored polymers therefrom.

In the commercial utilization of styrene products it frequently becomes necessary to ship or store monomeric styrene for considerable periods of time before polymerizing it to the resinous form. For practical reasons, particularly where large quantities are involved, it is very desirable that the monomeric styrene be handled or stored in metal containers. Unfortunately, however, when attempt is made to polymerize monomeric styrene which has been allowed to stand for a considerable time, i. e., at least several days, in contact with the commoner metals, such as iron, steel, lead, tin, etc., or compounds thereof, the polymer obtained is frequently so seriously discolored as to be unsalable. The nature of this discoloration, which is usually a faded yellowish tint, is not understood. It is known only that the color is probably not the result of dissolved metallic compounds, since the polystyrene has been found to be spectroscopically free of metal.

Only two means are known for obviating this tendency of styrene which has been stored in contact with metal to discolor on polymerization. One method is to ship and store the monomeric styrene in glass containers, an expensive and unsatisfactory procedure, particularly where large quantities are handled. According to the other procedure, the styrene is transported in metal containers and is then fractionally distilled before use to remove the color-forming bodies. This latter method is inconvenient and usually results in loss of material, since at the temperature required for such distillation, an appreciable proportion of the styrene is polymerized to relatively worthless products and is thus lost to the user. For these reasons, the storage and transportation of monomeric styrene have remained serious problems.

We have now discovered that the color-forming bodies present in monomeric styrene which has been stored in contact with metals or metal compounds may be removed by contacting the styrene with charcoal.

In practice, the monomeric styrene, before polymerization, is agitated for a short time at room temperature with a small proportion of activated charcoal, and is then filtered to remove the charcoal. Alternatively, the styrene may be allowed to percolate one or more times through a bed of charcoal in a false-bottomed container. Although activated charcoal has been found particularly suitable for my process, insofar as I am aware, charcoal of any type may be employed.

The monomeric styrene after treatment according to the invention is free of color-forming bodies and may be polymerized by usual procedures to a colorless product of great clarity.

The following examples will serve to illustrate my invention, but are in no sense limitative thereof.

Example 1

Monomeric styrene was stored for two months at room temperature in a closed iron container. This material, which was clear and colorless, was divided into two portions. One portion was not treated, and the other was agitated with finely divided activated charcoal for a few minutes and then filtered to remove the charcoal. Both portions of the styrene were polymerized by heating in glass vessels at 125° C. for 3 days. The polymer formed from the untreated portion was clear, but showed a dull yellowish tint. The polymer obtained from the treated sample was clear and colorless.

Example 2

The procedure of Example 1 was carried out using containers of lead, tin, brass, and bronze. In each instance the polymer formed from the untreated styrene was a yellowish color, whereas the polymer derived from the charcoal-treated styrene was clear and colorless.

Example 3

Monomeric styrene was stored at room temperature for several days in contact with lead acetate. A portion of this material, when polymerized, exhibited a strong yellow coloration. However, another portion after treatment with charcoal as described in Examples 1 and 2, gave a clear, colorless polymer.

For the sake of simplicity, the foregoing description has been limited to styrene. It will be understood, however, that the principles of the invention are equally applicable to other aromatic vinyl compounds, e. g., ethyl styrene, p-chlorostyrene, divinyl benzene, etc.

Other modes of applying the principle of my invention may be employed, change being made as regards the details hereinbefore disclosed, provided the step or steps stated by any of the following claims, or the equivalent of such stated step or steps, be employed.

I claim:

1. The method of treating a monomeric vinyl aromatic compound, which because of contact with a metal contains color-forming bodies which on subsequent polymerization of the vinyl compound would induce formation of a colored polymer, comprising contacting such vinyl compound with charcoal, whereby the color-forming bodies are removed and the monomeric compound is obtained in a form capable of being polymerized to a colorless solid.

2. The method of treating monomeric styrene, which because of contact with a metal contains color-forming bodies which on subsequent polymerization of the styrene would induce formation of a colored polymer, comprising contacting such styrene with charcoal, whereby the color-forming bodies are removed and the styrene is obtained in a form capable of being polymerized to a colorless solid.

3. The method of treating monomeric styrene, which because of contact with a metal contains colorless color-forming bodies which on subsequent polymerization of the styrene would induce formation of a colored polymer, comprising contacting such styrene with activated charcoal, whereby the color-forming bodies are removed and the styrene is obtained in a form capable of being polymerized to a colorless solid.

SYLVIA M. STOESSER.